(12) United States Patent
Wendt et al.

(10) Patent No.: US 9,796,516 B2
(45) Date of Patent: Oct. 24, 2017

(54) VESSEL FOR CONTAINING HEATED OR COOLED BEVERAGES

(71) Applicant: Service Ideas, Inc., Woodbury, MN (US)

(72) Inventors: Thomas Wendt, Colfax, WI (US); Gregory Poul, St. Paul, MN (US)

(73) Assignee: Service Ideas, Inc., Woodbury, MN (US)

( * ) Notice: Subject to any disclaimer, the term of this patent is extended or adjusted under 35 U.S.C. 154(b) by 0 days.

(21) Appl. No.: 15/051,520

(22) Filed: Feb. 23, 2016

(65) Prior Publication Data

US 2017/0240338 A1    Aug. 24, 2017

(51) Int. Cl.
| | | |
|---|---|---|
| B65D 81/38 | (2006.01) | |
| B65D 25/28 | (2006.01) | |
| B65D 55/16 | (2006.01) | |
| B65D 47/12 | (2006.01) | |

(52) U.S. Cl.
CPC ..... *B65D 81/3837* (2013.01); *B65D 25/2832* (2013.01); *B65D 47/12* (2013.01); *B65D 55/16* (2013.01)

(58) Field of Classification Search
CPC  B65D 81/3837; B65D 25/2832; B65D 47/12; B65D 55/16
USPC .................... 220/375, 592.27, 231; 215/306
See application file for complete search history.

(56) References Cited

U.S. PATENT DOCUMENTS

| | | |
|---|---|---|
| D190,837 S | 7/1961 | Johnson |
| D221,513 S | 8/1971 | Leary et al. |
| D268,900 S | 5/1983 | Douglas |
| D380,682 S | 7/1997 | Robinson |
| D383,392 S | 9/1997 | Quayle et al. |
| D403,968 S | 1/1999 | Devore |
| D413,517 S | 9/1999 | Zimny et al. |
| D449,993 S | 11/2001 | Schumann |
| D470,417 S | 2/2003 | Anderson |
| 7,270,244 B1 * | 9/2007 | Liu .................... A47J 41/0011 215/13.1 |
| D657,681 S | 4/2012 | Manderfield, Jr. et al. |
| D685,641 S | 7/2013 | Tomkins et al. |
| D686,080 S | 7/2013 | Tomkins et al. |
| D732,395 S | 6/2015 | Christian |
| D734,157 S | 7/2015 | Hawry |
| D766,111 S | 9/2016 | Henshaw et al. |
| 2009/0283533 A1 * | 11/2009 | Hemminger ......... B65D 43/022 220/592.17 |
| 2009/0308878 A1 * | 12/2009 | Rosskelly ............... A47J 31/56 220/592.16 |
| 2011/0233219 A1 * | 9/2011 | Proskey ................. A47J 41/00 220/592.17 |
| 2011/0284595 A1 | 11/2011 | Jamieson et al. |
| 2014/0166654 A1 * | 6/2014 | Lane .................. A47G 19/2272 220/262 |

* cited by examiner

*Primary Examiner* — King M Chu
(74) *Attorney, Agent, or Firm* — Skaar Ulbrich Macari, P.A.

(57) ABSTRACT

The disclosure includes an insulated container for beverages and the like. The container includes a double-walled vacuum vessel with a handle and an offset dispensing opening at the top of the vessel. The opening is sealable with a cap. A tether can be provided to secure the cap to the handle.

19 Claims, 8 Drawing Sheets

VESSEL FOR CONTAINING HEATED OR COOLED BEVERAGES

FIELD

The present invention relates generally to beverage containers and, more particularly, to a double wall vacuum vessel for maintaining the temperature of a beverage that is easy to fill and dispense.

BACKGROUND

With the growing popularity of beer microbrews there is a corresponding growth in demand for specialized vessels or containers to transport the beer in draft or tap form that is purchased from a microbrewery for off-site consumption. One such vessel is commonly referred to as a growler. Growlers are advantageous since they are re-usable and carry a larger volume of beer than cans or bottles. 64 ounces is a typical size, although sizes can vary. Most growlers are glass, but ceramic and stainless steel varieties are available.

One challenge with the use of a growler is maintaining the temperature of the beverage contained inside. Thus, a growler must be kept cool in a refrigerator, cooler, etc. just like a bottle or can of beer. Another challenge is filling the beer into an empty growler and later dispensing the beer while disturbing the contents as little as possible. Filling and dispensing operations can agitate the beer which releases the carbon dioxide and mixes in oxygen. This results in the beer having a flat taste and short life in the container. The growler also needs to be easy to handle during a dispensing operation while still being easy to carry. Thus, there is an ongoing need to provide for a beverage containing vessel that addresses one or more of these challenges.

SUMMARY

The present invention addresses certain deficiencies in the prior art by providing for vessels and containers that store heated or cooled liquids. The disclosure includes an insulated container for beverages and the like. The container includes a double-walled vacuum vessel with a handle and an offset dispensing opening at the top of the vessel. The opening is sealable with a cap. A tether can be provided to secure the cap to the handle.

The disclosure also includes a vessel comprising a main body, a cap and a handle assembly. The main body includes an inner wall defining an interior compartment of the vessel, an outer wall, a sealed gap space formed between the inner wall and the outer wall, and a top opening into the interior compartment of the vessel. The sealed gap space is in a vacuum state. The outer wall defines a vertically oriented cylindrical portion extending upward from a bottom surface of the vessel to a vertical height above a mid-height of the vessel. The outer wall defines a transition portion vertically above the vertically oriented cylindrical portion which extends vertically upward. The inner wall and outer wall converge together adjacent the top opening. The top opening is horizontally offset from a vertical centerline of the main body. The cap mates to the top opening to seal the interior compartment. The handle assembly is secured to the outer wall of the main body.

The disclosure further includes an insulated container. The container includes a main body comprising a double wall and an interior compartment of the container. A vacuum is formed in a gap within the double wall. The double wall converges to form a top opening into the interior compartment. The top opening is horizontally offset from a vertical centerline of the main body. A cap is configured to mate with the top opening to seal the interior compartment. A handle assembly is secured to an exterior of the main body. The handle assembly is horizontally located between the top opening and an outermost diameter of the main body such that the handle assembly does not protrude horizontally beyond the outermost diameter of the main body. A horizontal aperture is defined laterally through the handle assembly to permit grasping of the handle assembly with at least one human finger.

The disclosure additionally includes an insulated container comprising a main body comprising a double wall defining an interior compartment of the container. The interior compartment has a smooth and continuous surface. A vacuum is formed in a gap within the double wall. The double wall converges to form a top opening into the interior compartment. The top opening is horizontally offset from a vertical centerline of the main body. A cap is configured to mate with the top opening to enclose the interior compartment. A handle assembly is secured to an exterior of the main body. The handle assembly is horizontally located between the top opening and an outermost diameter of the main body such that the handle assembly does not protrude horizontally beyond the outermost diameter of the main body.

The handle assembly can be disposed on the transition portion of the main body. The handle assembly can extend between the top opening and the vertically oriented cylindrical portion such that the handle assembly does not protrude horizontally past the outer most circumference of the vertically oriented cylindrical portion. A horizontal aperture can be defined laterally through the handle assembly to permit grasping of the handle assembly with at least one human finger.

A tether can be provided to secure the handle assembly and the cap together. The tether defines a first end configured to be secured to the cap and an opposing second end secured to the handle assembly. The first end includes a ring sized to secure to the cap.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

Figure 1:
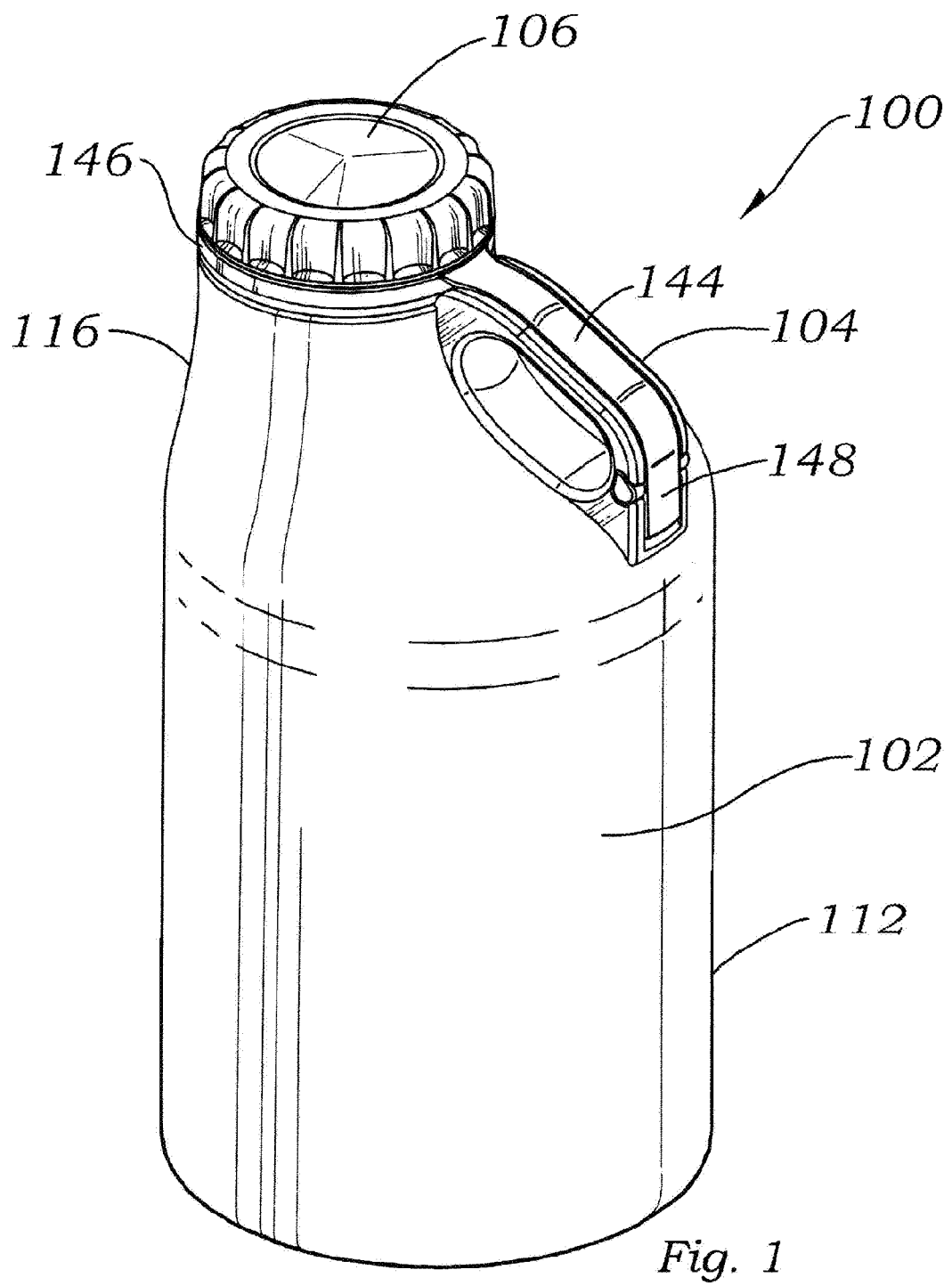
FIG. 1 is a perspective view of a vessel according to certain example embodiments.
Figure 2:
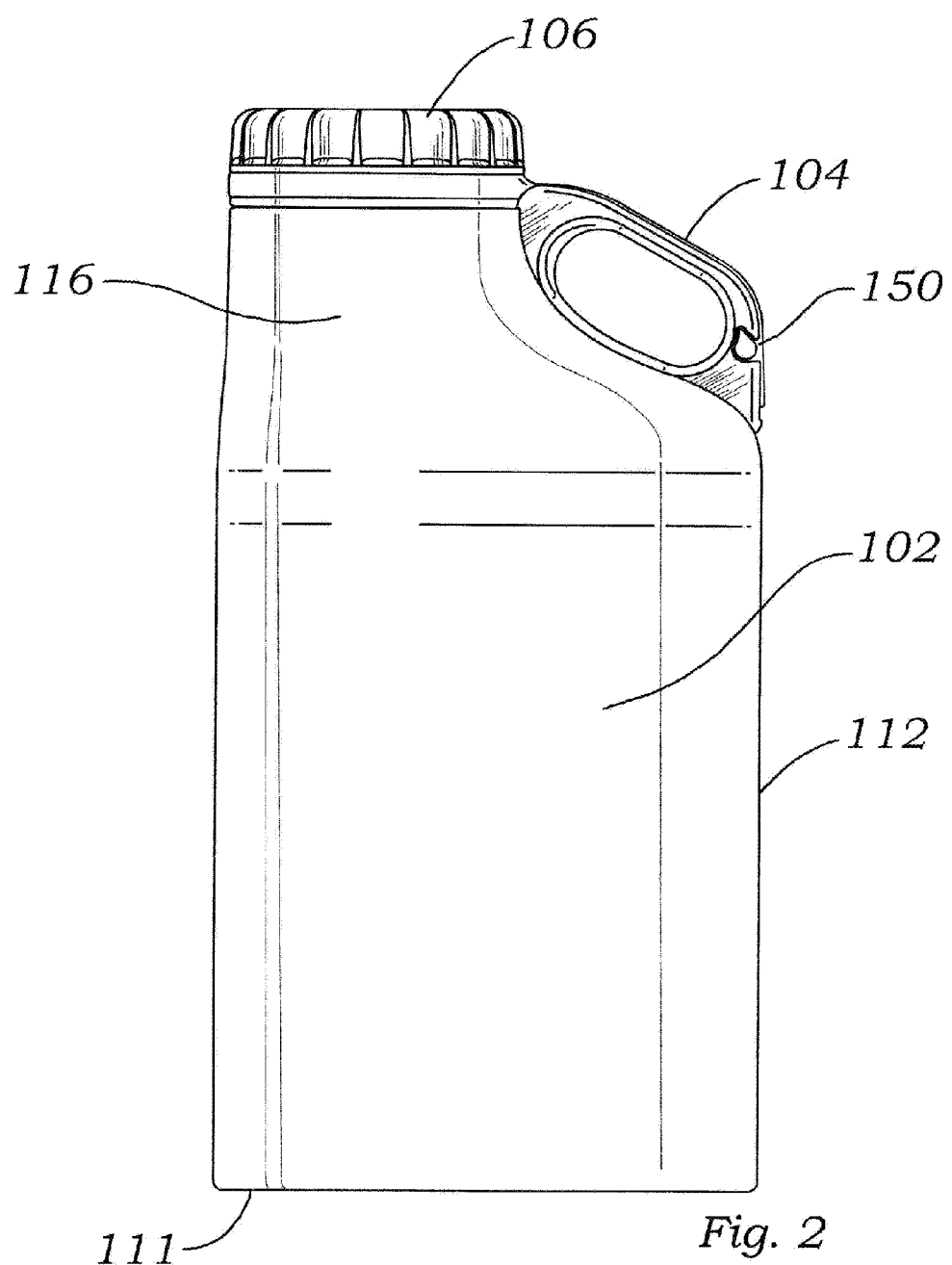
FIG. 2 is a front view of a vessel according to certain example embodiments.
Figure 3:
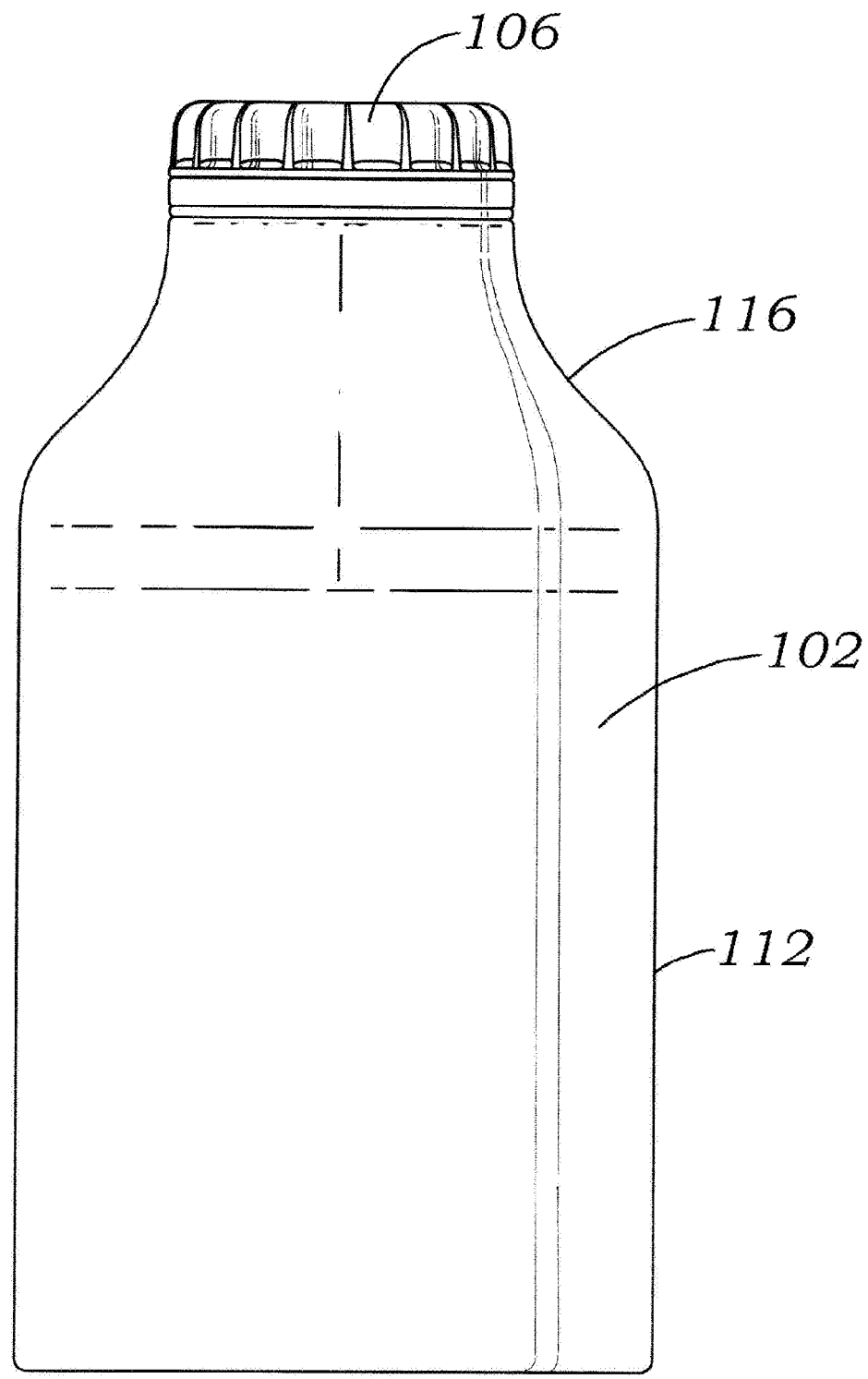
FIG. 3 is a side view of a vessel according to certain example embodiments.
Figure 4:
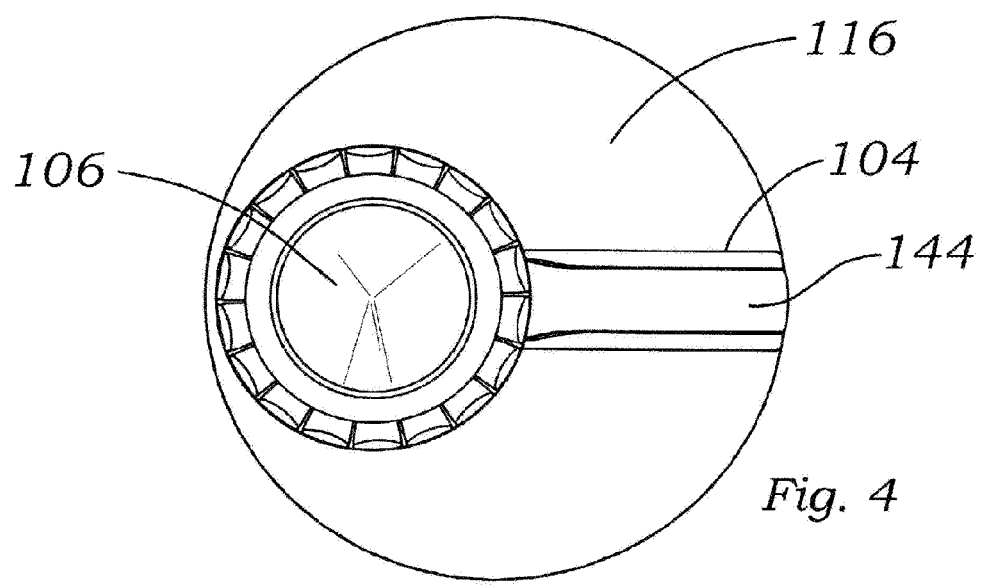
FIG. 4 is a top view a vessel according to certain example embodiments.
Figure 5:
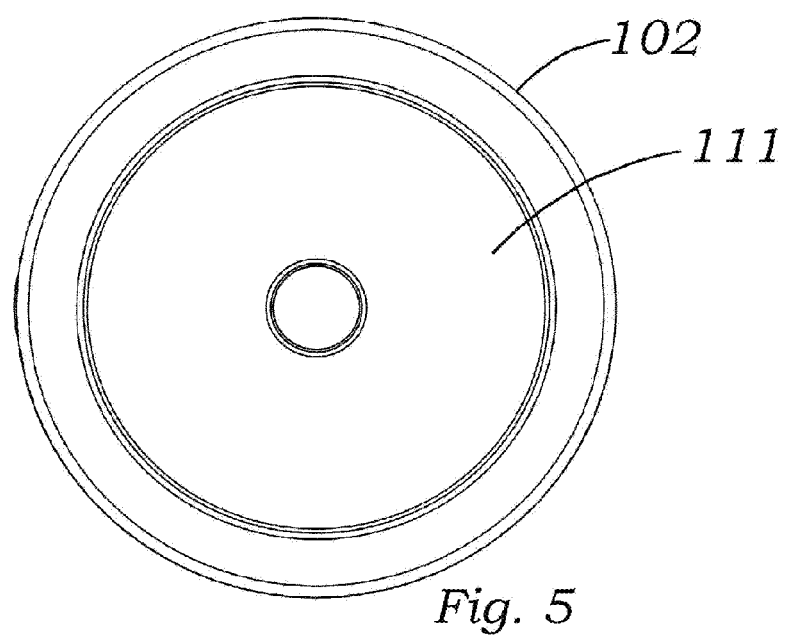
FIG. 5 is a bottom view of a vessel according to certain example embodiments.

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all combinations, modifications, equivalents, and alternatives falling within the scope of the invention as defined by the appended claims.

Referring to FIGS. 1-9, various views of a vessel 100 are shown. The vessel or container 100 will be discussed primarily with regard to use as a beer container or growler. However, the vessel 100 can be used to maintain the temperature (either above or below ambient temperature) of any flowable food product, including coffee, tea, water, soda, milk, juice, mixed beverages, soups, sauces and other non-viscous liquids.

Referring to FIGS. 1-7, the vessel 100 generally comprises a main body 102 including a handle assembly 104 and a removable cap 106 that covers an opening 108 into the interior compartment 110. The main body 102 defines a generally flat bottom 111 so that the vessel can sit on a flat surface. The bottom 111 can also include one or more recessed portions.

The main body 102 comprises a generally vertical cylindrical wall or exterior surface 112 extending from approximately the bottom end 111 upwards above the vertical mid-height of the vessel 100. The wall 112 is vertically oriented in this cylindrical region. Continuing upward, the wall 112 then smoothly tapers inward to define a tapered or transitional portion 116 that terminates in the mouth or top opening 108. A flange or lip 118 is defined around the top opening to receive the cap 106. Threads 120 are provided to the outer surface of the lip 118 to allow the cap 106 to be secured over the mouth 108 with a twisting motion if the inner surface of the cap 106 has respective spiral threads.

The top opening 108 is radially offset from the cylindrical center axis of the main body 102. In other words the top opening is offset from the vertical midline of the vessel. This can be easily appreciated when looking at the top plan view of FIG. 4. The offset opening or mouth 108 makes for a straighter transition from the interior compartment 110 though the mouth 108 when pouring. Thus, the contents of the vessel can be poured with less disturbance, which in the case of beer, reduces the foaming action when pouring. The same is true of the filling operation. The offset mouth 108 also makes it easier to place the mouth closer to the fill dispenser or nozzle (e.g. the tap) and smoothly pour the liquid into the vessel. Offsetting the mouth also provides for more space in the transition area 116 for a longer handle 104 as will be discussed below.

Figure 6:
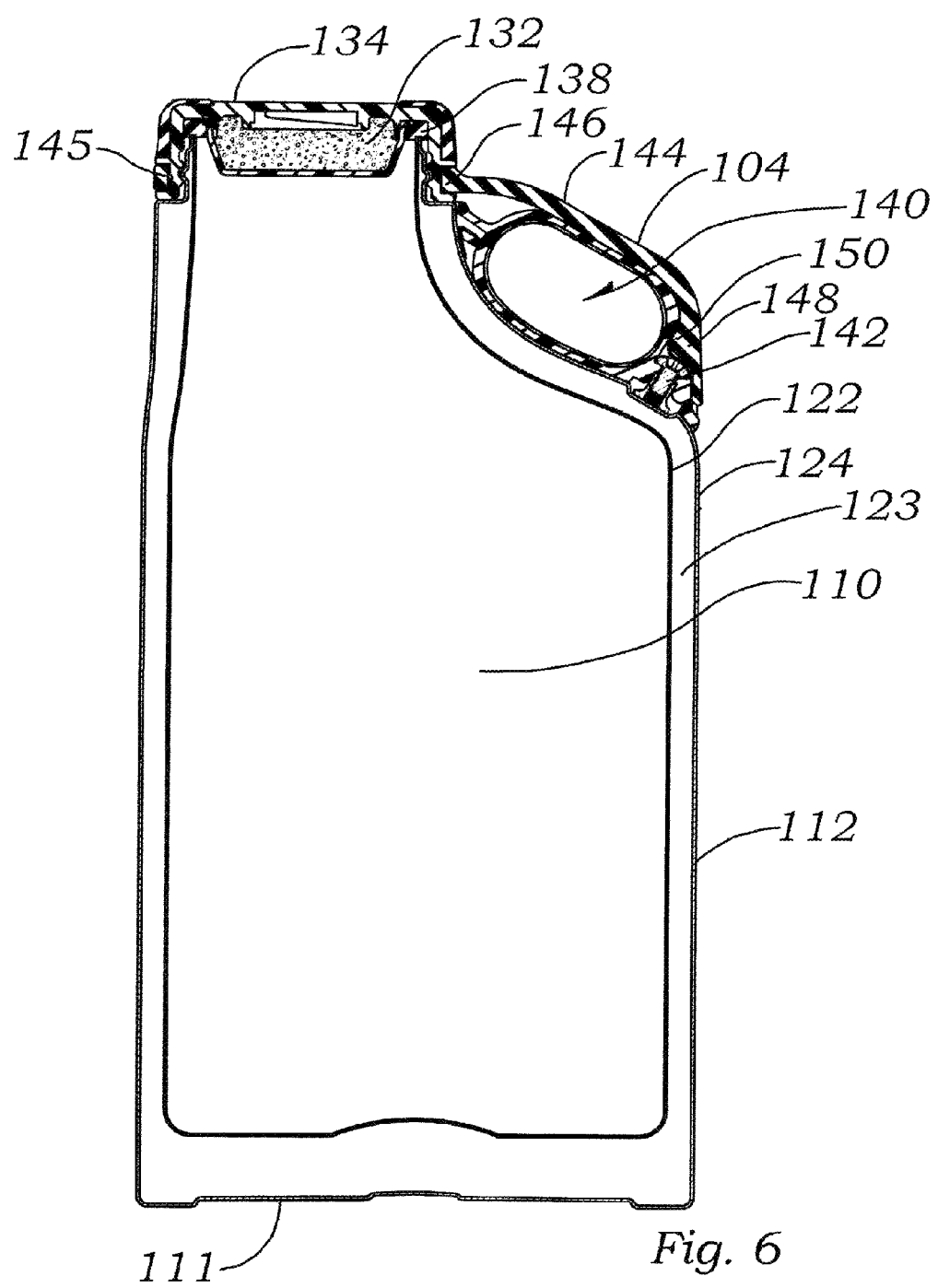
FIG. 6 is a front cross-sectional view of a vessel according to certain example embodiments.
Figure 7:
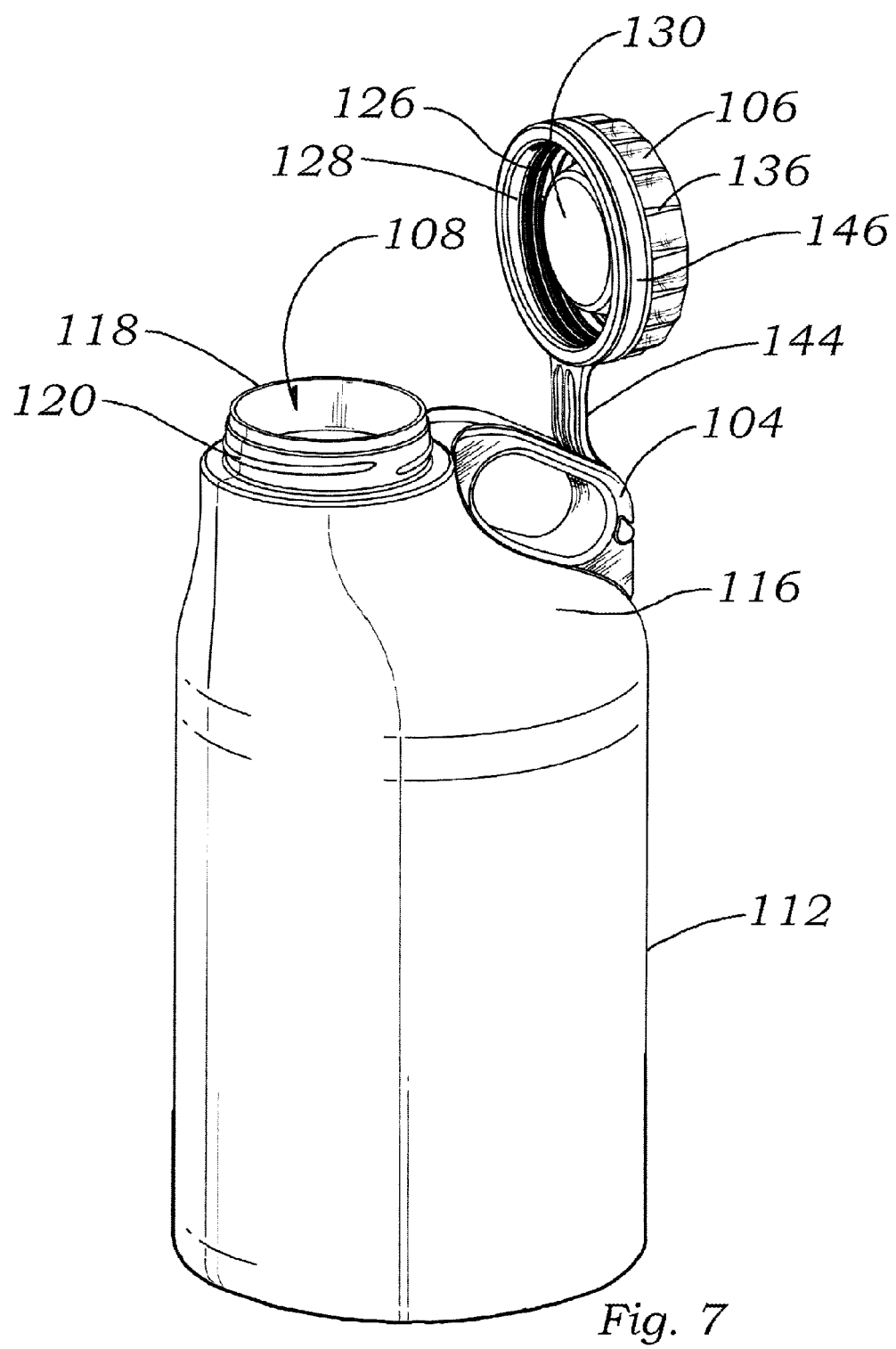
FIG. 7 is a perspective view of a vessel with a cap removed according to certain example embodiments.

Referring now to the cross-sectional view of FIG. 6, it can be seen that the main body 102 of the vessel 100 is double-walled. In other words, there is an inner wall 122 and an outer wall 124 forming the wall 112 of the vessel. There is a space or gap 123 between the respective inner 122 and outer 124 walls. The gap space 123 is sealed and is held in a vacuum state. This results in excellent insulating performance of the vessel 100. The gap or space 123 between the walls is maintained everywhere except where the outer edge of the lip 118 is formed at the top opening 108.

The smooth continuous inner surface 122 extends all the way to the top of the lip at the opening 108. Such smooth continuous surface with the minimal transition (as compared to conventional vessels with centered openings) allows for the smooth and undisturbed pouring of the contents of the vessel, and the filling of the same.

Referring again to FIGS. 1-7, the cap 106 is a circular disc with an annular recess 126 defined in the bottom side of the cap 106. The annular recess 126 defines grooves 128 to engage the respective grooves 120 of the lip 118. The central portion 130 of the cap surrounded by the groove 126 protrudes downward to provide the cap 106 with insulation 132 so that heat does not enter or escape through the cap 106. The outer or upper surface of the cap 134 can be provided with an array of ribs 136 or other texture so that the user can more easily grip the cap 106. The cap 106 can also be polygonal or a complex horizontal shape in certain alternatives. A rubber gasket 138 can be provided to the inner channel 126 to seal against the tip edge of the lip of the mouth as is shown in FIG. 6.

A handle assembly 104 is provided to the tapered portion 116 of the main body 102. The handle assembly 104 defines a horizontal aperture 140 that the user can hook with one or more fingers to securely hold the vessel 100. The bottom side of the handle assembly 104 is sealed against the body 102 of the vessel so that no liquid can penetrate underneath the handle assembly. A screw 142 or other fastener can be used to secure the handle assembly 104 tightly against the outer surface of the vessel.

The handle assembly 104 does not laterally protrude or horizontally extend past the vertical cylindrical wall portion 112 of the main body. Such configuration minimizes the potential for damage to the handle 104 and also allows for the vessel to be compactly packed by the user in a variety of ways without the handle 104 causing interference. The handle is also preferably rotationally aligned to be opposite of the mouth 108. This allows the handle length to be maximized without protruding past the vertical side wall portion. The longer handle allows the user to grasp the vessel with more fingers as compared to a handle on a conventional vessel.

A tether 144 can be provided to secure the cap 106 to the handle assembly 104 so that the cap 106 does not become lost or require that the user find a place to set the cap when removed from the mouth 108. A first end 146 of the tether 144 forms a hoop or ring that fits around the outer circumference of the cap 106. A respective groove 145 can be defined in the outer surface of the cap 106 to securely retain the ring 144 in place. The opposing end 148 of the tether 144 is secured to the handle assembly 104. The tether 144 spans continuously between the hoop end 146 and the opposing secured end 148. The opposing secured end 148 can be secured into a notch 150 defined in the handle assembly as shown in FIGS. 1, 2, 6 and 7. The opposing end 148 also covers over the fastener as can be seen in FIGS. 1 and 6.

The tether 144 is configured to resist accidental removal from the handle assembly. For example, the vessel 100 can be carried by the tethered cap 106 or by the first end 146 of the tether 144, even when fully filled, because the opposing secured end 148 is secured to the handle assembly 104 via the notch 150. The opposing end 148 can be deliberately removed from the handle assembly, if desired by the user, by lifting the flap portion of the opposing end 148 and withdrawing the teardrop shaped lugs from the notch 150 in the handle assembly.

The main body 102 (including both inner 122 and outer 124 walls) is preferably formed of stainless steel. However, glass can be used as a lining or as the material for the inner wall 122. The outer wall 124 can receive an outer coating such as paint, plastic or rubber, in whole or in part, without departing from the scope of the invention. In certain embodiments, the vessel meets NSF International's standards, so the vessel 100 can be qualified to be used for prepared foods.

The handle assembly 104 is preferably formed of a rigid plastic. A rubber coating or overmolding can be provided to a portion of the handle assembly, such as the aperture channel through the handle, to enhance the ability to grip the handle.

The cap can be formed of a rigid plastic material or similar. Again, an outer rubber coating can be provided so that the lid can be easily grasped by the user.

Figure 8:
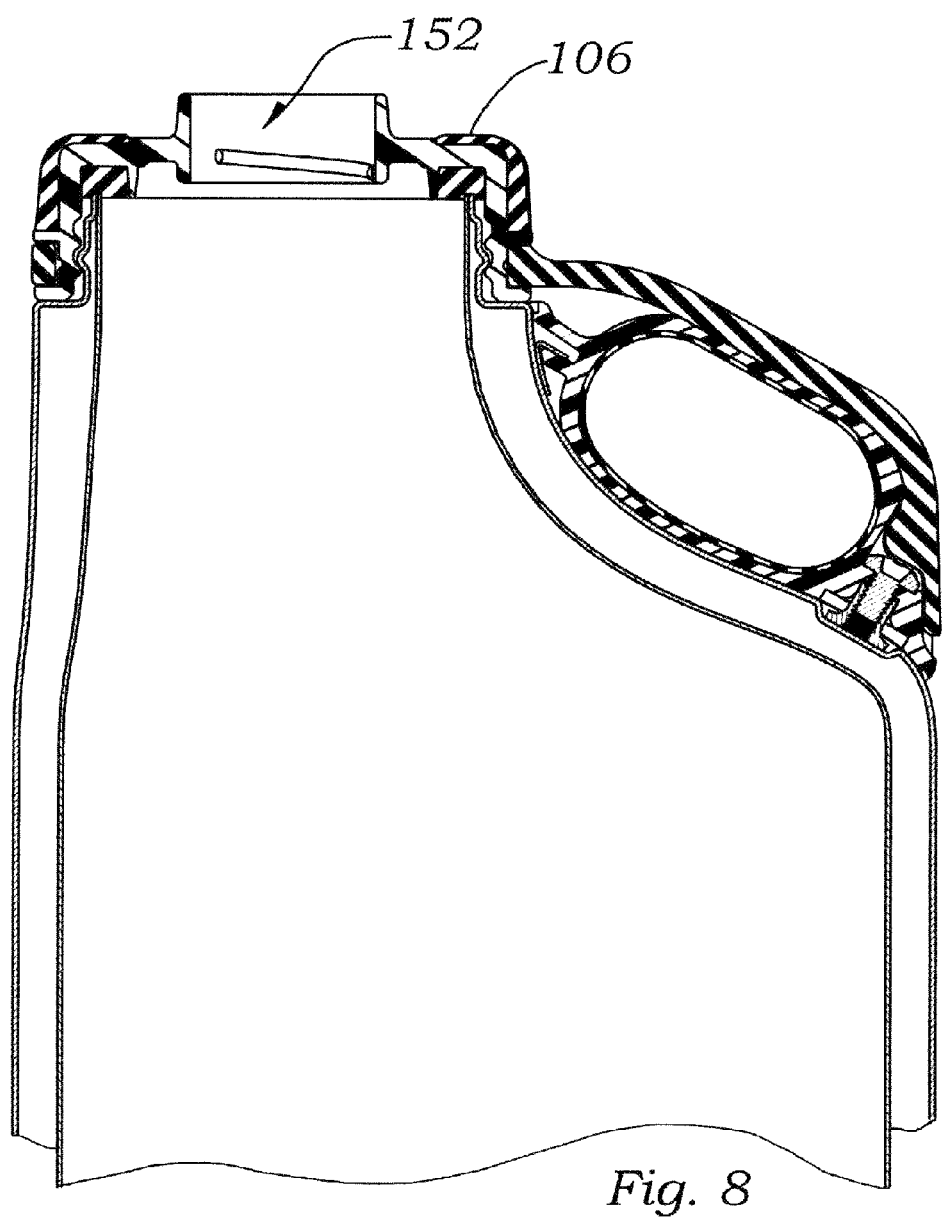
FIG. 8 is a cross-sectional view of a portion of a vessel according to certain example embodiments.
Figure 9:
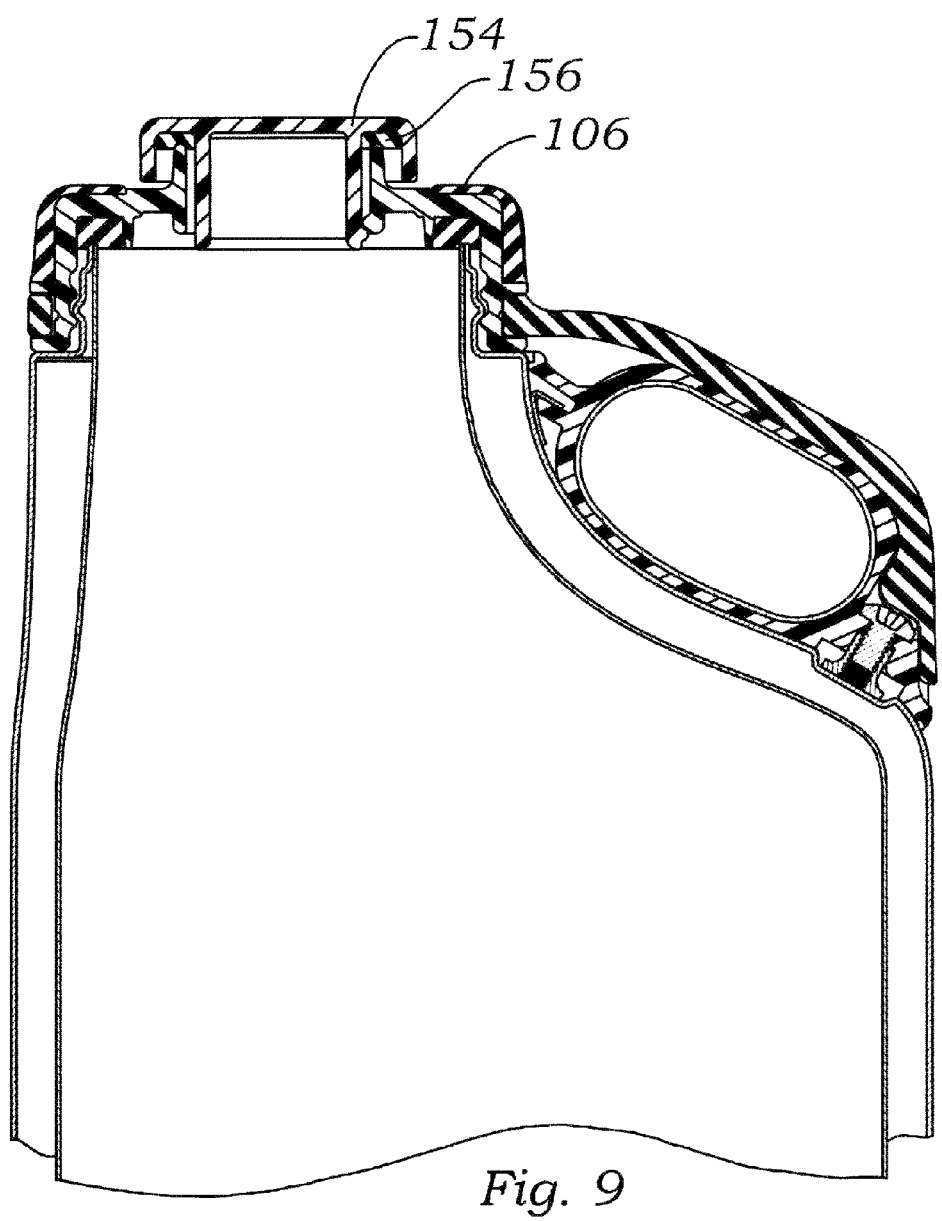
FIG. 9 is a cross-sectional view of a portion of a vessel according to certain example embodiments.

An alternative configuration of the cap 106 is shown in FIGS. 8 and 9. The cap 106 now includes a center opening 152 or aperture and a secondary closure 154 to seal the center opening 152. The center opening 152 is sized and configured to mate with a filling apparatus. Note that the filling apparatus can be adapted for filling the vessel with liquids, such as beer, in a manner that minimizes oxygen introduction into the interior compartment, which will keep the beer tasting fresher for a longer time. The center opening 152 and secondary closure 154 in the cap 106 allows the vessel to be filled using a filling apparatus while the user can still remove the entire cap 106 to dispense through the full mouth 108. The secondary closure 154 can be secured in place via threads or a frictional or interference fit.

The secondary closure 154 can be formed of the same materials and coatings as the main cap 106. An inner gasket 156 can be provided to the secondary cap 154 to best seal over the center opening 152.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

For purposes of interpreting the claims for the present invention, it is expressly intended that the provisions of 35 U.S.C. §112(f) are not to be invoked unless the specific terms "means for" or "step for" are recited in a claim.

What is claimed is:

1. A vessel comprising:
   a main body comprising:
      an inner wall defining an interior compartment of the vessel;
      an outer wall;
      a sealed gap space formed between the inner wall and the outer wall; and
      a top opening into the interior compartment of the vessel,
      wherein the sealed gap space is in a vacuum state,
      wherein the outer wall defines a vertically oriented cylindrical portion extending upward from a bottom surface of the vessel to a vertical height above a mid-height of the vessel,
      wherein the outer wall defines a transition portion vertically above the vertically oriented cylindrical portion which extends vertically upward,
      wherein the inner wall and outer wall converge together adjacent the top opening, and
      wherein the top opening is horizontally offset from a vertical centerline of the main body;
   a cap mated to the top opening to seal the interior compartment;
   a handle assembly secured to the outer wall of the main body; and
   a tether secured to the handle assembly and to the cap, the tether defining a first end configured to be secured to the cap and an opposing second end configured to be secured to the handle assembly, the first end including a ring sized to secure to the cap.

2. The vessel of claim 1, wherein the handle assembly is disposed on the transition portion of the main body, the handle assembly extending between the top opening and the vertically oriented cylindrical portion such that the handle assembly does not protrude horizontally past a circumferential extent of the vertically oriented cylindrical portion, wherein a horizontal aperture is defined laterally through the handle assembly to permit grasping of the handle assembly with at least one human finger.

3. The vessel of claim 1, wherein the tether is removable from the handle assembly and from the cap.

4. The vessel of claim 1, wherein the cap comprises:
   an annular recess defined in a bottom side of the cap;
   an insulated central portion surrounded by the annular recess; and
   an outer surface defining an array of ribs.

5. The vessel of claim 4, wherein the cap further includes a rubber gasket provided in the annular recess to seal against a raised lip portion of the top opening of the vessel.

6. The vessel of claim 1, wherein the cap comprises:
   a center opening through a vertical height of the cap; and
   a secondary cap configured to enclose the center opening,
   wherein the center opening has a smaller diameter than a diameter of the top opening in the vessel.

7. The vessel of claim 1, wherein the inner wall and the outer wall are both formed of stainless steel.

8. The vessel of claim 1, wherein at least portions of the handle assembly and the cap are provided with a rubber coating.

9. The vessel of claim 1, wherein the cap seals the top opening via threaded engagement.

10. The vessel of claim 1, wherein the inner wall is a smooth and continuous surface.

11. An insulated container, comprising:
   a main body comprising a double wall and an interior compartment, wherein a vacuum is formed in a gap within the double wall, wherein the double wall converges to form a top opening into the interior compartment, and wherein the top opening is horizontally offset from a vertical centerline of the main body;
a cap configured to mate with the top opening to seal the interior compartment; and
a handle assembly secured to an exterior of the main body, the handle assembly horizontally located between the top opening and an outermost diameter of the main body such that the handle assembly does not protrude horizontally beyond the outermost diameter of the main body, wherein a horizontal aperture is defined laterally through the handle assembly to permit grasping of the handle assembly with at least one human finger.

12. The container of claim 11, further comprising a tether secured to the handle assembly and the cap, the tether defining a first end configured to be secured to the cap and an opposing second end secured to the handle assembly, the first end including a ring sized to secure to the cap.

13. The container of claim 11, wherein the cap comprises:
an annular recess defined in a bottom side of the cap;
an insulated central portion surrounded by the annular recess; and
an outer surface defining an array of ribs.

14. The container of claim 13, wherein the cap further includes a rubber gasket provided in the annular recess to seal against a raised lip portion of the top opening of the vessel.

15. The container of claim 11, wherein the cap comprises:
a center opening through a vertical height of the cap; and
a secondary cap configured to enclose the center opening, wherein the center opening has a smaller diameter than a diameter of the top opening in the vessel.

16. The container of claim 11, wherein the double wall is formed of stainless steel.

17. The container of claim 11, wherein at least portions of the handle assembly and the cap are provided with a rubber coating.

18. An insulated container, comprising:
a main body comprising a double wall defining an interior compartment of the container, the interior compartment having a smooth and continuous surface, wherein a vacuum is formed in a gap within the double wall, wherein the double wall converges to form a top opening into the interior compartment, and wherein the top opening is horizontally offset from a vertical centerline of the main body;
a cap configured to mate with the top opening to enclose the interior compartment; and
a handle assembly secured to an exterior of the main body, the handle assembly horizontally located between the top opening and an outermost diameter of the main body such that the handle assembly does not protrude horizontally beyond the outermost diameter of the main body.

19. The container of claim 18, further comprising a tether secured to the handle assembly and the cap, the tether defining a first end configured to be secured to the cap and an opposing second end secured to the handle assembly, the first end including a ring sized to secure to the cap.

* * * * *